United States Patent
Khan et al.

(12) 
(10) Patent No.: US 6,366,330 B1
(45) Date of Patent: *Apr. 2, 2002

(54) CHOLESTERIC LIQUID CRYSTAL DISPLAY THAT PREVENTS IMAGE STICKING

(75) Inventors: Asad Aziz Khan, Kent; Xiao-Yang Huang, Stow, both of OH (US)

(73) Assignee: Kent Displays Incorporated, Kent, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/469,548

(22) Filed: Dec. 22, 1999

Related U.S. Application Data

(63) Continuation-in-part of application No. 08/862,561, filed on May 23, 1997, now Pat. No. 6,172,720.

(51) Int. Cl.[7] .......................... G02F 1/133; C09K 19/54; C09K 19/30
(52) U.S. Cl. ............................ 349/35; 349/36; 349/176; 349/182; 252/299.5; 252/299.61; 428/1.1
(58) Field of Search .......................... 252/299.5, 299.61; 349/35, 36, 176, 182, 40; 428/1.1

(56) References Cited

U.S. PATENT DOCUMENTS

| | | |
|---|---|---|
| 3,697,150 A | 10/1972 | Wysocki |
| 4,118,335 A | 10/1978 | Krause et al. |
| 4,323,472 A | 4/1982 | Sethofer |
| 4,422,951 A | 12/1983 | Sugimori et al. |
| 4,507,222 A | 3/1985 | Inoue et al. |
| 4,528,116 A | 7/1985 | Dabrowski et al. |
| 4,548,731 A | 10/1985 | Sugimori et al. |
| 4,564,694 A | 1/1986 | Hirai et al. |
| 4,650,836 A | 3/1987 | George et al. |
| 4,695,398 A | 9/1987 | Goto et al. |
| 4,704,228 A | 11/1987 | Inoue et al. |
| 4,729,639 A | 3/1988 | Hubbard |
| 4,778,620 A | 10/1988 | Goto et al. |
| 4,846,999 A | 7/1989 | Kizaki |
| 4,874,543 A | 10/1989 | Yoshida |
| 4,917,819 A | 4/1990 | Goto et al. |
| 4,994,204 A | 2/1991 | Doane et al. |
| 5,198,149 A | 3/1993 | Reiffenrath et al. |
| 5,251,048 A | 10/1993 | Doane et al. |
| 5,271,865 A | 12/1993 | Hittich et al. |
| 5,307,190 A | 4/1994 | Wakita et al. .............. 349/158 |
| 5,315,419 A | 5/1994 | Saupe et al. |
| 5,348,685 A | 9/1994 | Mohcizuki et al. |
| 5,354,489 A | 10/1994 | Inoue et al. |
| 5,354,496 A | 10/1994 | Elliott |
| 5,370,819 A | 12/1994 | Fujita et al. |
| 5,418,281 A | 5/1995 | Yung et al. |
| 5,434,685 A | 7/1995 | Pirs et al. |
| 5,437,811 A | 8/1995 | Doane et al. |
| 5,468,421 A | 11/1995 | Matsui et al. |
| 5,554,316 A | 9/1996 | Fujita et al. |
| 6,034,752 A * | 3/2000 | Khan et al. ................... 349/74 |
| 6,172,270 B1 * | 1/2001 | Khan et al. ................... 349/35 |

OTHER PUBLICATIONS

S. Kelly, J. Funfschilling, A. Villager; "2–(4Alkylphenyl)–5–(alkenloxy) pyrimidines: synthesis, liquid crystal transition temperatures and some physical properties", (1994).

M. Schadt, F. Muller, "Influence of solutes on material constants of luiquid crystals and on electro–optical properties of twisted nematic displays" Journal of Chemical Physics vol. 65, No. 6, pp2224–2230 (1976).

D. Martire, G. Oweimreen, G. Agren, S. Ryan, H. Peterson, "The effect of quasispherical solutes on the nematic to isotropic transition in liquid crystals", Journal of Chemical Physics vol. 64, No. 4, pp1456–1463 (1976).

L. Chow, D. Martire, "Thermodynamics of solutions with liquid crystal solvents. IV. GLC determination of the degree of order in a nematic mesophase", Molecular Crystals and Liquid Crystals vol. 14, pp293–306 (1971).

P. Cladis, J. Rault,J. Burger, "Binary mixtures of rod–like molecules with p=mehtoxybenzylidene–p–n–butylaniline", Molecular Crystals and Liquid Crystals, vol. 13, pp1–8 (1971).

Ch. Gahwiller, "The viscosity coefficients of room temperature liquid crystal (MBBA)", Physical Letters vol. 36A, No. 4, (1971).

W. Helfrich, "Capillary flow of cholesteric and smectic liquid crystals", Physical Review Letters, vol. 23, No. 7 (1969).

H. Pruecher, R. Jubb, U. Finkenzeller, "Physical properties of liquid crstals VII. Viscosities of nematic liquid crystal materials".

H. Schmiedel, R. Stannarius, M. Grigutsch, "Determination of viscoelastic coefficients from optical transmission of a planar liquid crystal cell with low frequency modulated voltage", J. Applied Phys. 74(10) (1993).

M. Schadt, "Solute induced transmission changes in liquid crystal twist cells" Physics Letters vol 57A, No. 5 (1976).

* cited by examiner

*Primary Examiner*—Shean C. Wu
(74) *Attorney, Agent, or Firm*—Watts, Hoffman, Fisher & Heinke Co., L.P.A.

(57) ABSTRACT

A liquid crystal material for a display device includes a liquid crystal material comprising first chiral nematic liquid crystal component and a second component that exhibits no liquid crystalline phase. The second component is present in an amount not greater than 5% by weight based upon the total weight of the liquid crystal display material and is effective to avoid image sticking of the display device when in use. The liquid crystal material has positive dielectric anisotropy. The second component may have a molecular weight not exceeding 205 grams/mole.

32 Claims, 1 Drawing Sheet

CHOLESTERIC LIQUID CRYSTAL DISPLAY THAT PREVENTS IMAGE STICKING

CROSS-REFERENCE TO RELATED APPLICATION

This application is a Continuation-In-Part application of, and claims priority from, U.S. patent application Ser. No. 08/862,561 entitled "Low Viscosity Liquid Crystal Display Material" filed on May 23, 1997 now U.S. Pat. No. 6,172,720 B1, hereby incorporated by reference in its entirety.

GOVERNMENT RIGHTS

This application was made in part with Government support under cooperative agreement numbers N61331-94C-0041 and N61331-96C-0042 awarded by the Defense Advanced Research Projects Agency (DARPA). The Government has certain rights in this invention.

FIELD OF INVENTION

The present invention is directed to a chiral nematic liquid crystal material for use in a display device. More specifically, the invention relates to chiral nematic liquid crystal materials that include organic additives in an amount effective to avoid image sticking in a liquid crystal display device.

BACKGROUND OF THE INVENTION

Current cholesteric liquid crystal display devices, upon application of an electric field, exhibit a planar texture which selectively reflects a certain wavelength of light depending on the pitch length of the material. A focal conic texture is also present, in which light is scattered, not reflected. Such displays are preferably designed so that both the focal conic and planar textures are stable in the absence of an electric field.

Cholesteric displays are often used in public information signs and static image applications because of the wide viewing angle and its low power bistable operation modes. During operation of the liquid crystal display device, there are times when a pixel within the display remains in the focal-conic texture for some period and is then switched to the planar texture and vice versa. If the intensity level of this planar state is less than that of a pixel that was previously in the planar state, or conversely, if the intensity levels between focal conic textures of the same pixel are greater than that of a pixel that was previously observed in the earlier focal conic texture, the display is said to have image sticking. As a result of image sticking, the previous image of the display affects the new image of the display: a ghost image from the previous image appears in addition to the new image. For example, suppose the capital letter "T" is displayed by a cholesteric liquid crystal display device. The display may comprise a dark background wherein the light is scattered by the focal conic texture. The letter "T" would be defined by a brighter area within the dark background in which the liquid crystal is in the planar texture. Now suppose the letter is changed to the capital letter "I" and superimposes the position where the letter "T" was observed. If image sticking occurred, the outwardly extending horizontal portions of the letter "T" would still be slightly visible. In this example, the horizontal portions would be slightly lighter than the surrounding dark background but darker than the light portion used to display the letter "I". Thus, the display would undesirably show a ghost image of the non-overlapping portions of the letter "T". Generally, between updates, a display is refreshed to minimize the effect of image sticking. However, image sticking can be strong enough so that a refresh pulse is unable to completely erase the previous image.

Efforts have been made to eliminate image sticking or reduce the degree of image sticking by modification of driving waveforms. Various types of erasing waveform combinations have been discussed previously. For example, U.S. Pat. No. 5,644,330 entitled "Driving Method for Polymer Stabilized and Polymer Free Liquid Crystal Displays", to Catchpole et al. discloses erasing waveforms. By employing a good erasing waveform, image sticking can be significantly reduced or even eliminated in some cases. However, it is noticed that in certain display configurations, image sticking cannot be completely removed solely by optimization of the driving waveforms. The degree of image sticking becomes very profound when the time duration between updates is long, i.e., greater than 24 hours. End users can usually heat the display above the isotropic transition temperature to eliminate the image sticking result from long time storage or shipping. However, this practice is not cost effective and user friendly. The invention addresses the problem of image sticking from a liquid crystal formulation approach.

SUMMARY OF THE INVENTION

The present invention is directed in general to a liquid crystal mixture for a display device which comprises a first chiral nematic liquid crystal component, and a second component that, by itself, exhibits no liquid crystalline phase at any temperature. The second component is present in an amount effective to avoid image sticking and/or reduce the bulk viscosity of the material by at least about 26% and, more preferably, by at least about 46%. The liquid crystal mixture preferably has a positive dielectric anisotropy. Display devices that include the present material exhibit greatly improved properties including higher contrast ratios, shorter pulse widths, lower driving voltages and no image sticking during display use.

In particular, at least in the case of viscosity lowering additives, the second component is achiral and has a molecular weight not exceeding about 205 grams/mole. The second component, when used as an image sticking additive, is preferably in an amount ranging greater than 0% to not greater than 5% by weight based upon the total weight of the material and, more preferably, in an amount ranging up to 3% by weight. Amounts of all chemical components herein are in % by weight based upon the total weight of the liquid crystal material, unless otherwise indicated.

A preferred embodiment of the invention is directed to a display device comprising a liquid crystal material including the first chiral nematic liquid crystal component, and the second component which exhibits no liquid crystalline phase at any temperature. The second component is effective for avoiding image sticking during display use and/or reducing viscosity of the liquid crystal material. Cell wall structure cooperates with the material to form focal conic and twisted planar textures that are stable in the absence of a field. A device applies an electric field for transforming at least a portion of the material to at least one of the focal conic and twisted planar textures.

The first component is a chiral nematic liquid crystal material. The second component may be a blend of additives that give the desired properties. More preferably, the second component is one compound that avoids image sticking. The material cooperates with the cell wall structure to form focal conic and twisted planar textures that are stable in the absence of a field.

The second component that helps avoid image sticking and/or lowers the viscosity of the material may be comprised of a compound having the following general formula I:

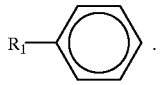

wherein $R_1$ is selected from the group consisting of an alkyl group, a substituted alkyl group and an alkoxy group each having from 1 to 9 carbon atoms.

More preferably, the second component may have the following formula:

wherein A comprises any group that renders the second component polar and soluble in the first component. In this regard, group A preferably comprises a cyano group. In the case wherein the additive is used for viscosity lowering properties, when group A is a cyano group the second component preferably does not include seven carbon atoms.

Preferred substituted phenyl compounds that satisfy the general formula I comprise the following: 1-phenylpentane, 1-phenylhexane, 1-cyclohexylbenzene, p-cyanopentylbenzene, 4-phenylbutyronitrile and p-cyanophenylheptane.

Alternatively, the second component for avoiding image sticking and/or lowering the viscosity of the material may be comprised of a compound having the following formula II:

$$R_2—B \qquad \text{II.}$$

wherein $R_2$ is selected from the group consisting of an alkyl group and an alkoxy group each having from 1 to 11 carbon atoms and B comprises any group that renders the second component polar and soluble in the first chiral nematic liquid crystal component. A preferred second component having a formula that satisfies formula II is undecyl cyanide.

The second component in the case of both formulas I and II preferably has a molecular weight not exceeding about 205 grams/mole at least in the case of viscosity lowering additives and possibly for additives that avoid image sticking. Groups A and B are preferably cyano groups. $R_1$ and $R_2$ are preferably alkyl, substituted alkyl groups or alkoxy groups.

The image sticking and/or viscosity lowering additive of formula I is preferably comprised of a monocyclic aromatic compound such as benzene. However, those skilled in the art would appreciate in view of this disclosure that the viscosity lowering and/or image sticking additive may comprise other aromatic compounds. For example, the image sticking and/or viscosity lowering additive may comprise a heterocyclic compound. In this regard, nitrogen heterocyclic compounds (e.g., pyridine) may be suitable for use in the present invention. Biphenyl compounds are generally not suitable for use in the present invention unless they do not exhibit a liquid crystalline phase at any temperature and have a molecular weight less than about 205 grams/mole. It is well within the abilities of a skilled chemist to empirically determine which aromatic or heterocyclic compounds are suitable for use in the present invention by using these compounds in place of the benzene ring in accordance with formula I, adding the resultant material to a chiral nematic component and observing whether the material is soluble and avoids image sticking during display use and/or lowers the viscosity of the material according to the present invention.

The following is a list of definitions of terms used in this disclosure:

"Heteroatom" is a nitrogen, sulfur or oxygen atom. The heteroatoms of groups that contain more than one heteroatom may be the same or different.

"Alkyl" is an unsubstituted or substituted saturated hydrocarbon chain radical. Preferred alkyl groups have from 1 to 11 carbon atoms ("lower alkyls") and include (for example) methyl, ethyl, propyl, butyl, pentyl and heptyl.

"Cycloalkyl" is a saturated hydrocarbon ring radical. One preferred cycloalkyl is cyclohexyl.

"Heterocyclic ring" is an unsubstituted or substituted, aromatic ring radical comprised of carbon atoms and one or more heteroatoms in the ring. The aromatic compounds of the invention, including any heterocyclic compounds, are preferably monocyclic.

"Alkoxy" is an oxygen radical having a hydrocarbon chain substituent, where the hydrocarbon chain is an alkyl or alkenyl (ie., —O-alkyl or —O-alkenyl).

As defined above and as used herein, substituent groups may themselves be substituted. Substituents that may be suitable for use in the present invention are listed in C. Hansch and A. Leo, *Substituent Constants for Correlation Analysis in Chemistry and Biology* (1979), which is incorporated herein by reference.

These and other objects, advantages and features of the invention will become better understood from the detailed description of the invention which is described in conjunction with the accompanying drawings.

DETAILED DESCRIPTION OF PREFERRED EMBODIMENTS

Figure 1:
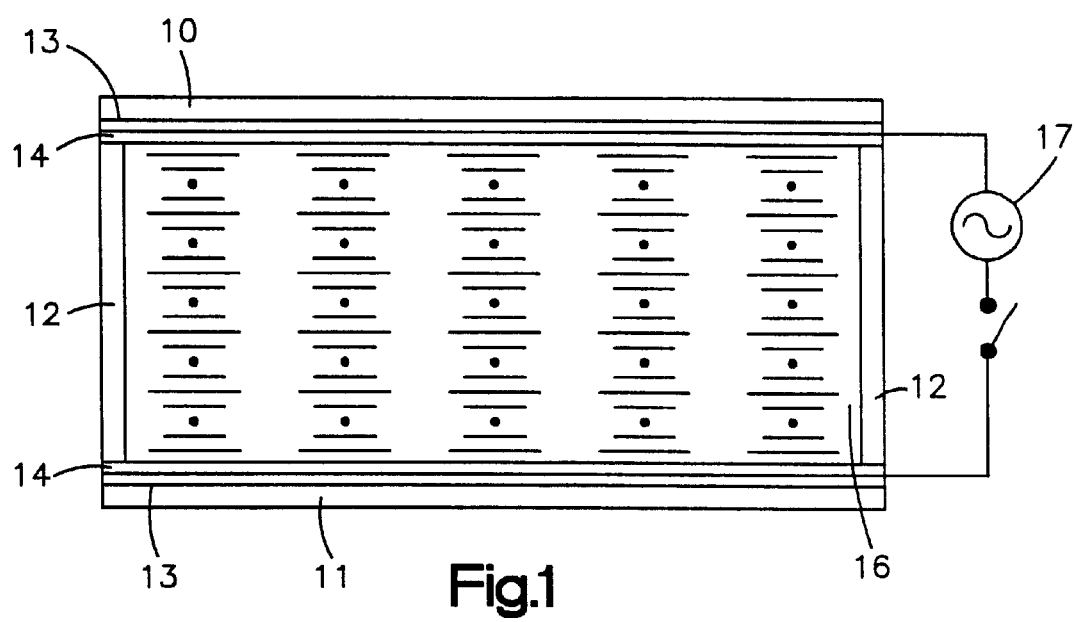
FIG. 1 is a diagrammatic view of a liquid crystal cell that may be used in connection with the present invention.

The present invention is directed to a cholesteric liquid crystal material for a display device including a first chiral nematic liquid crystal component and a second component comprised of an additive or additives for avoiding image sticking and/or lowering the viscosity of the material. The liquid crystal material of the present invention has positive dielectric anisotropy. The anti-image sticking and viscosity lowering additives are preferably achiral and are characterized by their low molecular weight and by their inability to exhibit any liquid crystalline phase at any temperature. The anti-image sticking additives and viscosity reducing additives are similar in structure and may be one compound having dual functionalities when used in a display device.

During operation of a cholesteric liquid crystal display device, a pixel is frequently switched from a focal conic texture to a planar texture and vice versa by application of different voltages to the display pixels. Depending on the use and application of the display device, pixels in the display may remain in either texture for a prolonged period of time before being switched to the other texture. For example, image sticking is believed to occur when the pixel switches from the focal conic texture to the planar texture and the light intensity of the pixel is now less than that of an earlier planar texture of the same pixel under identical conditions. Likewise, image sticking occurs when the pixel switches from the planar texture to the focal conic texture wherein the light intensity of the pixel is now greater than that of an earlier focal conic texture of the same pixel under identical conditions. That is, the planar texture has slightly lower reflectance or the focal conic texture has slightly higher reflectance, respectively. Consequently, if enough pixels are affected, the viewer will observe a ghost image. It is believed that the ghost image occurs when the transition from the focal-conic texture to the planar texture or vice versa, is not complete. When the ghost image occurs as a result of the transition from focal conic to planar texture, the planar texture is believed to have some focal conic domains and consequently, the intensity of the light reflected is diminished. Conversely, when the ghost image occurs as a result of the transition from planar to focal conic texture, the focal conic texture is believed to have some planar domains and consequently, the intensity of the light reflected is increased. A refresh-pulse above the focal conic-homeotropic transition voltage is applied to completely transform the texture to the homeotropic state and consequently remove any ghost image. If the planar texture cannot be restored by refresh pulses or updates, the end user of the display is required to heat the display unit above a clearing temperature so that an isotropic state is achieved. The isotropic state is then cooled slowly to yield large domain focal conic textures which when switched to the planar texture do not exhibit the ghost image. Of course, in some devices it is not possible to heat the display unit to avoid image sticking. The present invention advantageously avoids image sticking by use of an additive in the liquid crystal material.

The anti-image sticking and/or viscosity lowering additives of the invention comprise either of the following general formulas I or II. Formula I is directed to anti-image sticking and/or viscosity lowering additives in the form of the following substituted phenyl compounds:

wherein group $R_1$ is selected from the group consisting of an alkyl group, a substituted alkyl group and an alkoxy group having from 1 to 9 carbon atoms; and group A is an optional group that comprises any group that renders the second component polar and soluble in the chiral nematic liquid crystal component.

Formula II is directed to anti-image sticking and/or viscosity lowering additives in the form of the following polar compounds:

$$R_2\text{—B} \qquad \qquad \text{II.}$$

wherein group $R_2$ comprises an alkyl or alkoxy group having from 1 to 11 carbon atoms and group B comprises any group that renders the second component polar and soluble in the first chiral nematic liquid crystal component.

An anti-image sticking and/or viscosity lowering additive is soluble as defined herein if, in a mixture of the additive and chiral nematic liquid crystal material which is filled into a cell, no separation of the additive is visible to the naked eye. An anti-image sticking and/or viscosity lowering additive is polar as defined herein if the center of negative charge of the molecule does not coincide with the center of positive charge of the molecule. The polarity relates to the dipole moment of the molecule, as calculated by $\mu$=ed, wherein $\mu$ is the dipole moment of the molecule, e is charge and d is the distance of separation between charges.

In preferred form, $R_1$ and A are located at the para position on the benzene ring in formula I. $R_1$ and A may be located at the meta position on the benzene ring if the resultant material is soluble in the chiral nematic liquid crystal material. Each of groups A and B may be a lower alkyl or alkoxy group or a cyano group, and is preferably a cyano group. All of the alkyl and alkoxy groups of formulas I and II are preferably straight chain groups but may also be branched or cyclic. $R_1$ may comprise a cyclic alkyl or alkoxy group having from 3 to 6 carbon atoms.

An odd number of carbon atoms is preferable in the alkyl and alkoxy groups of formulas I and II. This is because using an odd number of carbon atoms in these groups may lower the nematic-isotropic phase transition temperature less than when an even number of carbon atoms is used. The anti-image sticking and/or viscosity lowering additives of formula I may be either polar or non-polar.

The anti-image sticking and/or viscosity lowering additives of formulas I and II may include other substituents on the alkyl group, the alkoxy group and on the benzene ring, as long as the substituents result in an anti-image sticking additive that is soluble and avoids image sticking according to the present invention or a viscosity lowering additive that is soluble and lowers the viscosity of the material. In this regard, some substituents that may be suitable for use in the present invention include Cl, F, $OCF_3$, $NO_2$ and OCHF.

A preferred substituted phenyl compound that satisfies the general formula I is p-cyanopentylbenzene. This compounds is shown by the following formula Ia. A preferred additive having a formula that satisfies formula II is undecyl cyanide, which is shown by the following formula IIa. The compounds Ia and IIa may include substituents such as those discussed above.

$$C_{11}\text{—CN} \qquad \qquad \text{IIa.}$$

The following Table 1 provides information as to the anti-image sticking and/or viscosity lowering additives.

TABLE 1

| Additive | BP/MP/P[1] (° C./° C./mm Hg) | MW (g/mol) | Polarity |
|---|---|---|---|
| p-cyanopentylbenzene | 93/na[3]/100 | 173.26 | polar |
| 1-phenylhexane | 226/−61/na | 162.28 | non-polar |
| 1-cyclohexylbenzene | 239/5/na | 160.26 | non-polar |
| 1-phenylpentane | 205/−75/na | 148.25 | non-polar |
| undecyl cyanide | 198/na/100 | 181.32 | polar |
| 4-phenylbutyronitrile | 97/99/1.7 | 147.22 | polar |
| p-cyanophenylheptane | 118/na/1.0–1.6 | 202.32 | polar |

[1]Boiling Point/Melting Point/Pressure (at atmospheric pressure unless otherwise indicated)
[2]Molecular Weight
[3]na = not applicable The anti-image sticking and/or viscosity lowering additives are relatively small in size compared to the size of the chiral nematic component, and have a molecular weight not greater than about 205 grams/mole. Even more preferably, the additives of the present invention have a molecular weight ranging from about 140 to about 205 grams/mole. It is preferred that the additive of formula I include only one benzene ring.

Surprisingly, the applicants have found that small amounts of the additive avoid image sticking. A small amount of additive suitable for avoiding image sticking is not greater than 5% by weight based on the total weight of the liquid crystal material. Larger amounts of the additive, e.g. in excess of 5%, substantially reduce clearing temperatures which may be problematic for operating certain display devices. Preferably, the anti-image sticking additive is present in an amount ranging from about 0 to 5%. More preferably, the anti-image sticking additive is present in an amount ranging from about 2 to 5%, alternatively, in an amount greater than 0 up to 3%. Although amounts greater than 5% by weight of the additive may avoid image sticking it is surprising that smaller amounts avoid image sticking because the benefits of contrast and switching speeds observed with the higher amounts of additive required for the viscosity reducing properties are not significantly present at amounts not less than 5% of the anti-image sticking additives.

Clearing temperature is defined as the temperature at which the cholesteric to isotropic phase transition is observed. For example, using 10% by weight additive in the liquid crystal composition significantly reduced the clearing temperature of one material by about 25° C., from about 85° C. to about 60° C. In this example, the display device would not work properly at temperatures above 60° C. The preferred clearing temperature in this illustrative example would be greater than 70° C. Anti-image sticking additives are effective for avoiding image sticking at not greater than 5% by weight of the total liquid crystal material and at these amounts advantageously have little effect on clearing temperature.

In general, the liquid crystal mixture of the present invention comprises:

a chiral nematic material in an amount up to about 100%;
an anti-image sticking material in an amount not greater than 5%;
a dye in an amount ranging from 0 to about 2%;
a monomer in an amount ranging from 0 to about 1.2%; and
a photoinitiator ranging from 0 to about 0.3%.

The chiral nematic material may comprise, for example, one or more of the following materials obtained from Merck Ltd.: BL061 and BL100. Many other chiral nematic materials may also be suitable for use in the present invention as would be appreciated by those skilled in the art.

The pitch length of the liquid crystal materials of the invention are adjusted based upon the following equation (1):

$$\lambda_{max} = n_{av} \cdot p_0 \quad (1)$$

where $\lambda_{max}$ is the peak reflection wavelength (wavelength at which reflectance is a maximum), $n_{av}$ is the average index of refraction of the liquid crystal material, and $p_0$ is the natural pitch length of the cholesteric helix.

Definitions of cholesteric helix and pitch length and methods of its measurement, are known to those skilled in the art such as can be found in the book, Blinov, L. M., *Electro-optical and Magneto-Optical Properties of Liquid Crystals*, John Wiley & Sons Ltd. 1983. The pitch length is modified by adjusting the concentration of the chiral material in the liquid crystal mixture. For most concentrations of chiral dopants, the pitch length induced by the dopant is inversely proportional to the concentration of the dopant. The proportionality constant is given by the following equation (2):

$$p_0 = 1/(HTP \cdot c) \quad (2)$$

where c is the concentration in % by weight of the chiral dopant and HTP is the proportionality constant.

The nematic material is used to adjust the concentration of the chiral material and thus, the pitch length of the material. The amount of nematic material that is added depends upon the desired wavelength of radiation that is to be reflected by the liquid crystal material. For example, little or no E44 needs to be used to produce a display that reflects light having a short wavelength, eg., blue. About 52% of E44 is used to produce a display that reflects radiation having a wavelength in the infrared wavelength range of the electromagnetic spectrum. The present material may be used in display devices disclosed in patent application Ser. No. 08/823,329 filed Mar. 22, 1997 U.S. Pat. No. 6,034,752 entitled "Display Device Reflecting Visible and Infrared Radiation," in enhanced brightness displays disclosed in the patent application filed Aug. 23, 1999, Ser. No. 09/378,830, entitled "Brightness Enhancement for Bistable Cholesteric Displays", and in color displays disclosed in the 08/823,329 application, in the patent application filed Jun. 10, 1999 U.S. Pat. No. 6,034,752, Ser. No. 09/330,104, entitled "Stacked Color Liquid Crystal Display Device" and in the patent application Ser. No. 09/329,587, filed Jun. 10, 1999 entitled "Stacked Color Liquid Crystal Display Device", all of which are incorporated herein by reference in their entirety.

The amount of nematic liquid crystal material to be added to the chiral nematic material to adjust the pitch length to produce a material reflecting radiation having various wavelengths, would be apparent to those skilled in the art in view of this disclosure. It would also be apparent to those skilled in the art that instead of adjusting the pitch length of the material by adding the nematic component to the chiral nematic component, a material having the desired pitch length may be produced by adding a chiral dopant to a major amount of a nematic component.

The nematic material may comprise, for example, one or more of the following materials obtained from Merck Ltd.: E44, BL101, E7, ZLI-3308, ZLI-3273, ZLI-5048-000, ZLI-5049-100, ZLI-5100-100, ZLI-5800-000 and MLC-6041-100. Other nematic materials may also be suitable for use in the present invention as would be appreciated by those skilled in the art.

The following anti-image sticking and/or viscosity reducing additives of the present invention were obtained from the Aldrich Chemical Company: 1-phenylpentane, 1-phenylhexane, 1-cyclohexylbenzene, 4-phenylbutyronitrile and undecyl cyanide. The anti-image sticking and/or viscosity reducing additives, p-cyanopentylbenzene and p-cyanophenylheptane, were synthesized according to procedures referred to in the 08/862,561 application.

The anti-image sticking additive is present in an amount ranging from greater than 0% to not greater than 5% by weight based on the total weight of the material. The anti-image sticking additive may function as a viscosity reducing additive depending on the amount of additive used. However, the benefits of contrast and speed observed with the higher amounts required for the viscosity reducing properties are not significantly observed with the amounts used for avoiding image sticking. More preferably, the anti-image sticking additives are present in an amount ranging from about 2 to not greater than 5%. The invention contemplates that the image sticking additives may be used alone or in combination with a viscosity lowering additive.

Properties of the liquid crystal display (e.g., contrast ratio, voltage, switching times, relaxation times from homeotropic to planar states) tend to improve with increasing amount of anti-image sticking and/or viscosity reducing additives. For example, a material comprising 5% of the p-cyanopentylbenzene additive, results in a display with a contrast ratio of about 30:1 at a voltage $V_4$ (voltage needed to transform the material from the focal conic to the homeotropic state with a pulse width of 100 milliseconds at a frequency of 250 hertz) of about 38 volts and a relaxation time of 150 milliseconds. A display incorporating 10% of this additive exhibits a contrast ratio of about 40:1, a voltage $V_4$ of 34 volts and a relaxation time of 110 milliseconds.

A dye in an amount ranging from about 0.25% to about 1.5% may also be used. Any suitable dye may be used in the present invention, for example, 4-hexylamino-4'-nitro-azobenzene (C6). Suitable dyes will be apparent to those skilled in the art in view of this disclosure.

The bistability of the liquid crystal material may be obtained using a polymer network or surface treatment, but requires neither. The polymer stabilized cholesteric texture (PSCT) displays employ substrates having surface treatments that promote homogeneous alignment, with the liquid crystal material including small amounts of monomer and photoinitiator. For a description of suitable polymer stabilized materials and their cell fabrication, refer to Doane, J. W., Yang, D. K., *Front-lit Flat Panel Display from Polymer Stabilized Cholesteric Textures*, Japan Display 92, Hiroshima October 1992; Yang, D. K. and Doane, J. W., *Cholesteric Liquid Crystal/ Polymer Gel Dispersion: Reflective Display Application*, SID Technical Paper Digest, Vol XXIII, May 1992, p. 759, et seq., as well as to U.S. Pat. No. : 5,570,216, entitled "Bistable Cholesteric Liquid Crystal Displays with Very High Contrast and Excellent Mechanical Stability;" U.S. Pat. No. 5,251,048, entitled "Method and Apparatus for Electronic Switching of a Reflective Cholesteric Display;" U.S Pat. No. 5,384,067, entitled "Gray Scale Liquid Crystal Material;" and U.S Patent Application entitled "Brightness Enhancement for Bistable Cholesteric Displays," filed Aug. 23, 1999, all of which are incorporated herein by reference in their entireties.

An example of a preferred polymer stabilized material includes the amounts of chiral nematic material, nematic material and viscosity lowering additive referred to above, and also includes a monomer in an amount ranging from about 1.0% to about 1.2% and a photoinitiator in an amount ranging from about 0.25% to about 0.3%. The amounts of the other components are decreased by an overall amount of about 1.5% when the monomer and photoinitiator are used. The monomer preferably comprises 4,4'-bisacryloylbiphenyl ("BAB") synthesized by Kent State University. The photoinitiator may comprise IRGACURE® 369 and 651 brand photoinitiators, which may be obtained from Ciba-Geigy Corp.

Regarding the polymer free materials, in some instances it is desirable to treat the cell walls and the electrodes with materials, such as passivation and alignment layers. By passivation layer, it is meant an insulating layer that prevents front to back shorting of the electrodes. The conductive coating is preferably comprised of transparent indium tin oxide (ITO), however, any conductive coating having good optical transmission may be utilized, such as conductive polymers and tin oxide. One example of a suitable passivation material is a $SiO_2$-like material known as NHC-720A, which is manufactured by Nissan Chemical. One example of a suitable alignment material is a polyimide material. The passivation layer has a thickness ranging from about 400 to about 1000 angstroms. Detergents or chemicals may be used to treat the cell walls to obtain variations in the contrast or switching characteristics. These treatments can be used to affect the uniformity of the liquid crystal, alter the stability of the various textures and to alter the strength of any surface anchoring. In addition to using a wide variety of materials for such surface treatments, the treatments on opposing substrates may differ. For example, the substrates may be rubbed in different directions, one substrate may include the treatment while the other may not, or opposite substrates may be used with different materials. As noted above, such treatments can have the effect of altering the effect of the cell response. The passivation layer or electrode material alone may sufficiently stabilize the focal conic texture. Optionally, other additives may be included in the chiral nematic liquid crystal mixture to alter the characteristics of the cell. For example, while color is introduced by the liquid crystal material itself, pleochroic dyes may be added to intensify or vary the color reflected by the cell. Similarly, additives such as fumed silica can be dissolved in the liquid crystal mixture to adjust the stability of the various cholesteric textures.

An example of a single cell display is shown in FIG. 1. The diagrammatically illustrated cell in FIG. 1 comprises glass substrates or plates 10, 11, which are sealed around their edges and separated by spacers 12. The glass plates are coated with indium tin oxide (ITO) or the like to form transparent electrodes 13. The reference character 14 represents an optional surface coating which can be applied to the electrodes to affect the liquid crystal directors, or to alter the contrast, reflection or switching characteristics of the cell. The opposite coatings 14 may be the same material or a different material, and may be rubbed in different directions, or one or both of the coatings 14 may be eliminated altogether. The cell may be filled with the polymer free or PSCT materials of the present invention. For other variations in rubbing and surface treatments, refer to the 09/378,830 application.

It would be appreciated by those skilled in the art that the liquid crystal material of the present invention may be incorporated into types of cells other than shown and described herein. For example, instead of being addressed by externally activated electrodes, the material may be addressed by an active matrix, a multiplexing scheme or other type of circuitry, all of which would be evident to those skilled in the art. Similarly, the cells can be prepared without the surface treatment layers 14.

The present invention may employ any suitable driving schemes and electronics known to those skilled in the art, including but not limited to that of the Doane and Yang articles referred to above as well as to the following, all of which are incorporated herein by reference in their entireties: U.S. Pat. No. 5,453,863, entitled "Multistable Chiral Nematic Displays", U.S. Pat. No. 5,748,277, entitled "Dynamic Drive Method and Apparatus", U.S. Pat. No. 5,251,048, entitled, "Method and Apparatus for Electronic Switching of a Reflective Color Display", U.S. Pat. No. 5,644,330, entitled "Method for Polymer Stabilized and Polymer Free Liquid Crystal Displays" and U.S. patent application Ser. No. 09/063,907, U.S. Pat. No. 6,268,840 entitled "Unipolar Waveform Drive Method and Apparatus for a Bistable Liquid Crystal Display". A passive matrix multiplexing type display is preferably used in the present invention. The effect that pulse amplitudes and widths have on each texture is described in the 5,453,863 patent. The present invention may utilize the addressing techniques described in the 5,453,863 patent to effect grey scale.

Displays comprising the material of the present invention have improved properties. One major improvement of the properties of displays made from the present liquid crystal material is contrast ratio. Contrast ratio is defined herein by dividing the following relationship (3) by the relationship (4):

(the intensity of reflected light in the planar state at the peak wavelength–background light) (3)

(the intensity of reflected light in the focal conic state at the peak wavelength–background light) (4)

Contrast ratio is calculated by illuminating the cell, normal to its surface, with monochromatic light in a dark room. Light is detected at 45° with respect to the plane of the substrate. The collection angle has an approximate field of view of 25 degrees. The contrast ratio may be about 17:1 for a conventional chiral nematic material.

The additives of the present invention provide liquid crystal materials with a significant reduction in image sticking and will now be described by reference to the following non-limiting example.

EXAMPLE 1

The following formulations shown in table 2 were tested for image sticking. The dye was added for color saturation. The cholesteric pitch was adjusted using the E44 nematic material to enable the material to reflect light having a wavelength in the visible range of the electromagnetic spectrum. The components were added together and mixed together on a vortex mixer for about 30 seconds. The mixture was then placed in an oven at 100° C. until the entire mixture was in the isotropic phase. The mixture was then mixed on the vortex mixer at room temperature until the material returned to the cholesteric phase. The time of the second mixing varies depending upon the concentration of the additive and the quantity of the mixture. Formulation I was a standard composition without any image sticking additive present. Formulations 2–3 contained undecyl cyanide ($C_{11}CN$) in varying amounts as the additive. Formulation 4 contained p-cyanopentylbenzene (CNP5) as the additive.

TABLE 2

| Formulation (components in weight %) | 1 Standard | 2 $C_{11}CN$ | 3 $C_{11}CN$ | 4 CNP5 |
|---|---|---|---|---|
| BL061 | 75.60 | 75.00 | 74.00 | 75.60 |
| E44 | 23.90 | 22.50 | 20.50 | 18.90 |
| C6 | 0.50 | 0.50 | 0.50 | 0.50 |
| Additive | 0.00 | 2.00 | 5.00 | 50.0 |

In the image sticking experiments, glass substrates of the cell having passivation layers and ITO electrodes were used. Soda lime glass substrates with the passivation layer were obtained from Applied Films Corporation as part number T1X0100. The ITO electrode layer was coated over the passivation layer and patterned using conventional methods known to those skilled in the art to divide the cell into four quarters, each quarter representing one pixel. The two substrates of the cell were separated by 5 $\mu m$ spacers and each pixel was 22 mm×22 mm in size. A hardcoat insulator layer, such as Nissan 720, is coated over the ITO layer to prevent shorting. Each glass substrate also included a high pretilt unrubbed polyimide alignment layer of about 250 Å in thickness over the ITO electrode layer. The alignment material is No. SE-7511L manufactured by Nissan Chemical. The cells were vacuum filled with the liquid crystal material formulated according to table 2 and then plugged. The back of the cell was coated black. The cell is heated to the isotropic state and cooled slowly to ensure a large domain focal conic texture. Once at room temperature, all pixels are switched to the planar state. Pixels 2 and 4 are switched to the focal conic state. The cells are left untouched for two weeks. After two weeks, pixels 1 and 2 are not changed. Pixel 3 is switched to the focal conic state and pixel 4 is switched to the planar state. No refresh pulse was applied. The cells were visually inspected to determine if intensity levels had changed. Any change in intensity levels was an indication that image sticking was present.

The following table 3 demonstrates the effect the additives had on image sticking.

TABLE 3

| Formulation | Additive | % by weight of additive | λ max | Image Sticking |
|---|---|---|---|---|
| 1 | none | — | 590 | Yes |
| 2 | undecyl cyanide | 2 | 589 | No |
| 3 | undecyl cyanide | 5 | 589 | No |
| 4 | p-cyanopentylbenzene | 5 | 577 | No |

The results indicate that the presence of the additive avoided image sticking. Cells prepared with liquid crystal material according to formulation 2, 3 and 4 did not exhibit image sticking during the two week interval. There were no intensity variations observed between the corresponding pixels after the 14 day period. For example, there was no observable change in intensity between pixel 1 which was in a planar texture during the 14 day period and pixel 4 which was switched from a focal conic texture to a planar texture after a period of 14 days. However, the cell made with formulation 1 containing no additive did show intensity differences after the 14 day period between the focal conic textures of pixels 2 and 3. The planar textures of pixels 1 and 4 also showed a change. However, since the planar textures have high brightness the intensity differences were less apparent. Thus, the experiments demonstrate that the additives in amount ranging from about 2 to 5% prevent image sticking. It is expected that amounts of these additives below 2% by weight may prevent image sticking as well.

The foregoing description of the preferred embodiments of the invention have been presented for purposes of illustration and description. It is not intended to be exhaustive or to limit the invention to the precise forms disclosed. Obvious modifications or variations are possible in light of the above teachings. The embodiments were chosen and described to provide the best illustration of the principles of the invention and its practical applications to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A liquid crystal display device comprising:
   a liquid crystal material comprising a first chiral nematic liquid crystal component and a second component that exhibits no liquid crystalline phase at any temperature, said second component being present in an amount not greater than 5% by weight based upon a total weight of said liquid crystal material and is effective to prevent image sticking on the display device during use thereof;

cell wall structure that cooperates with said liquid crystal material to form focal conic and planar textures that are stable in the absence of an electric field; and means for applying an electric field to said liquid crystal material for transforming at least a portion of said liquid crystal material to at least one of the focal conic and twisted planar textures.

2. The liquid crystal display device of claim 1 wherein said second component is achiral.

3. The liquid crystal display device of claim 1 comprising said second component in an amount ranging up to about 3% by weight based upon the total weight of the liquid crystal material.

4. The liquid crystal display device of claim 1 wherein said liquid crystal material has positive dielectric anisotropy.

5. The liquid crystal display device of claim 1 wherein said second component comprises an aromatic compound bonded to at least one of an alkyl, a cycloalkyl, an alkoxy and a cyclic alkoxy group.

6. The liquid crystal display device of claim 1 wherein said second component comprises at least one of an alkyl, a cycloalkyl, an alkoxy and a cyclic alkoxy group bonded to a group that renders said second component polar.

7. The liquid crystal display device of claim 1 wherein said first chiral nematic component comprises a first mixture of at least one chiral nematic liquid crystal material and at least one nematic liquid crystal material or a second mixture of at least one chiral dopant and at least one nematic liquid crystal.

8. The liquid crystal display device of claim 1 wherein said second component for preventing image sticking is selected from the group consisting of a compound of formula I and a compound of formula II:

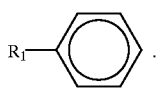
I wherein $R_1$ is selected from the group consisting of an alkyl, a cycloalkyl, an alkoxy and a cyclic alkoxy group each having from 1 to 9 carbons atoms; and $R_2$—B    II.

wherein $R_2$ is selected from the group consisting of an alkyl, a cycloalkyl, an alkoxy and a cyclic alkoxy group each having from 1 to 11 carbons atoms and B comprises any group that renders said second component polar and soluble in first component.

9. The liquid crystal display device of claim 1 wherein said second component has a molecular weight not exceeding 205 grams/mole.

10. The liquid crystal display device of claim 1 wherein said second component comprises the following formula:

wherein $R_1$ is selected from the group consisting of an alkyl, a cycloalkyl, an alkoxy and a cyclic alkoxy group each having from 1 to 9 carbons atoms; and wherein A comprises any group that renders said second component polar and soluble in first component.

11. The liquid crystal display device of claim 10 wherein group A is selected from the group consisting of a cyano group and an alkoxy group.

12. The liquid crystal display device of claim 1 comprising a first chiral nematic liquid crystal component and the second component for preventing image sticking, said second component comprising:

$R_2$—B wherein $R_2$ is selected from the group consisting of an alkyl, a cycloalkyl, an alkoxy and a cyclic alkoxy group each having from 1 to 11 carbons atoms and B comprises any group that renders said second component polar and soluble in first component.

13. The liquid crystal display device of claim 12 wherein group B is selected from the group consisting of a cyano group and an alkoxy group.

14. The liquid crystal display device of claim 1 wherein said second component is selected from the group consisting of undecyl cyanide and p-cyanopentylbenzene.

15. The liquid crystal display device of claim 1 wherein the second component is effective to prevent image sticking in the display device wherein a previous image would be retained on the display for a period of at least twenty four hours prior to addressing the display device with a new image with said electric field.

16. In a cholesteric liquid crystal display of the type comprising a chiral liquid crystal material and cell wall structure that cooperates with said liquid crystal material to form focal conic and planar textures that are stable in the absence of an electric field, wherein an electric field waveform applied to said liquid crystal material would transform at least a portion of the liquid crystal material to at least one of the focal conic and twisted planar textures to present an image on the display in which previous image remnants cannot be removed from the display resulting in image sticking with the application of said waveform, the improvement comprising:

an organic additive present in said liquid crystal material in an amount not greater than 5% by weight of the total weight of said liquid crystal material for preventing said image sticking, wherein said additive exhibits no liquid crystal phase at any temperature.

17. The improvement of claim 16 wherein said organic additive has a molecular weight not exceeding 205 grams/mole.

18. The improvement of claim 16 wherein said organic additive for preventing image sticking is selected from the group consisting of a compound of formula I and a compound of formula II:

I wherein $R_1$ is selected from the group consisting of an alkyl, a cycloalkyl, an alkoxy and a cyclic alkoxy group each having from 1 to 9 carbons atoms and A comprises any group that renders said organic additive polar and soluble in first component; and $R_2$—B    II.

wherein $R_2$ is selected from the group consisting of an alkyl, a cycloalkyl, an alkoxy and a cyclic alkoxy group each having from 1 to 11 carbons atoms and B comprises any group that renders said organic additive polar and soluble in first component.

19. The improvement of claim 16 wherein said organic additive comprises the following formula:

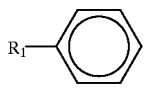

wherein $R_1$ is selected from the group consisting of an alkyl, a cycloalkyl, an alkoxy and a cyclic alkoxy group each having from 1 to 9 carbons atoms.

20. The improvement of claim 16 wherein said organic additive is selected from the group consisting of undecyl cyanide and p-cyanopentylbenzene and the combination thereof.

21. A liquid crystal material for a display device comprising a first chiral nematic liquid crystal component and a second component that prevents image sticking during use of the display device, wherein said second component comprises: a group $R_1$ bonded to an aromatic ring other than benzene, and an optional group A in the para or meta position on the aromatic ring, wherein said group A is any group that renders said second component polar and soluble in said first component, said $R_1$ group being an alkyl, a cycloalkyl, an alkoxy or cyclic alkoxy group each having from 1 to 9 carbons.

22. A liquid crystal material for a display device comprising a first chiral nematic liquid crystal component and a second component that prevents image sticking during use of the display device, wherein said second component comprises: a group $R_1$ bonded to a heterocyclic ring, said ring containing one or more heteroatoms selected from the group consisting of nitrogen, sulfur and oxygen atoms, and combinations thereof, and an optional group A bonded to the heterocyclic ring, wherein said group A is any group that renders said second component polar and soluble in said first component, said $R_1$ group being an alkyl, a cycloalkyl, an alkoxy or cyclic alkoxy group each having from 1 to 9 carbons.

23. In a method of operating a liquid crystal display device comprising chiral nematic liquid crystal material and cell wall structure that cooperates with said liquid crystal material to form focal conic and planar textures that are stable in the absence of an electric field, said method comprising applying an electric field waveform to said liquid crystal material for transforming at least a portion of the liquid crystal material to at least one of the focal conic and twisted planar textures which would present images on the display resulting in image sticking in which previous image remnants cannot be removed from the display with the application of said waveform, the improvement comprising: preventing said image sticking by forming said display device by adding to said liquid crystal material an additive in an amount of up to 5% by weight based upon a total weight of said liquid crystal material, said additive exhibiting no liquid crystalline phase at any temperature.

24. The improvement of claim 23 wherein said additive is achiral.

25. The improvement of claim 23 wherein said additive has a molecular weight not exceeding 205 grams per mole.

26. The improvement of claim 23 wherein said additive comprises the following formula:

wherein $R_1$ is selected from the group consisting of an alkyl, a cycloalkyl, an alkoxy and a cyclic alkoxy group each having from 1 to 9 carbons atoms and A comprises any group that renders said second component polar and soluble in first component.

27. The improvement of claim 23 wherein said additive comprises the following formula:

wherein $R_2$ is selected from the group consisting of an alkyl, a cycloalkyl, an alkoxy and a cyclic alkoxy group each having from 1 to 11 carbons atoms and B comprises any group that renders said second component polar and soluble in first component.

28. The improvement of claim 23 wherein said additive comprises the following formula:

29. The improvement of claim 23 wherein said additive comprises the following formula:

30. The improvement of claim 23 wherein said image sticking results from the previous image remnant being retained on the display for a period of at least twenty four hours prior to addressing the display device with said waveform to form a new image.

31. A liquid crystal display device comprising:

liquid crystal material comprising a first chiral nematic liquid crystal component and a second component that exhibits no liquid crystalline phase any temperature, said second component being present in an amount not greater than 5% by weight based upon a total weight of said liquid crystal material and is effective to prevent image sticking on the display device during use thereof;

cell wall structure that cooperates with said liquid crystal material to form focal conic and planar textures that are stable in the absence of an electric field; and a first and second set of spaced apart electrodes bounding at least a portion of said liquid crystal material, drive circuitry electrically coupled to said first and second set of spaced apart electrodes for applying selected voltages to one or more of said first and second set of spaced apart electrodes for transforming at least a portion of said liquid crystal material to at least one of the focal conic and planar textures.

32. The liquid crystal display device of claim 31 wherein said first and second set of spaced apart electrodes are substantially orthogonal to each other.

* * * * *